Feb. 25, 1969    R. J. JASPER ET AL    3,429,097
WRAPPER DISPENSING AND ROLL WRAPPING MECHANISM
Filed Sept. 17, 1965    Sheet 3 of 5
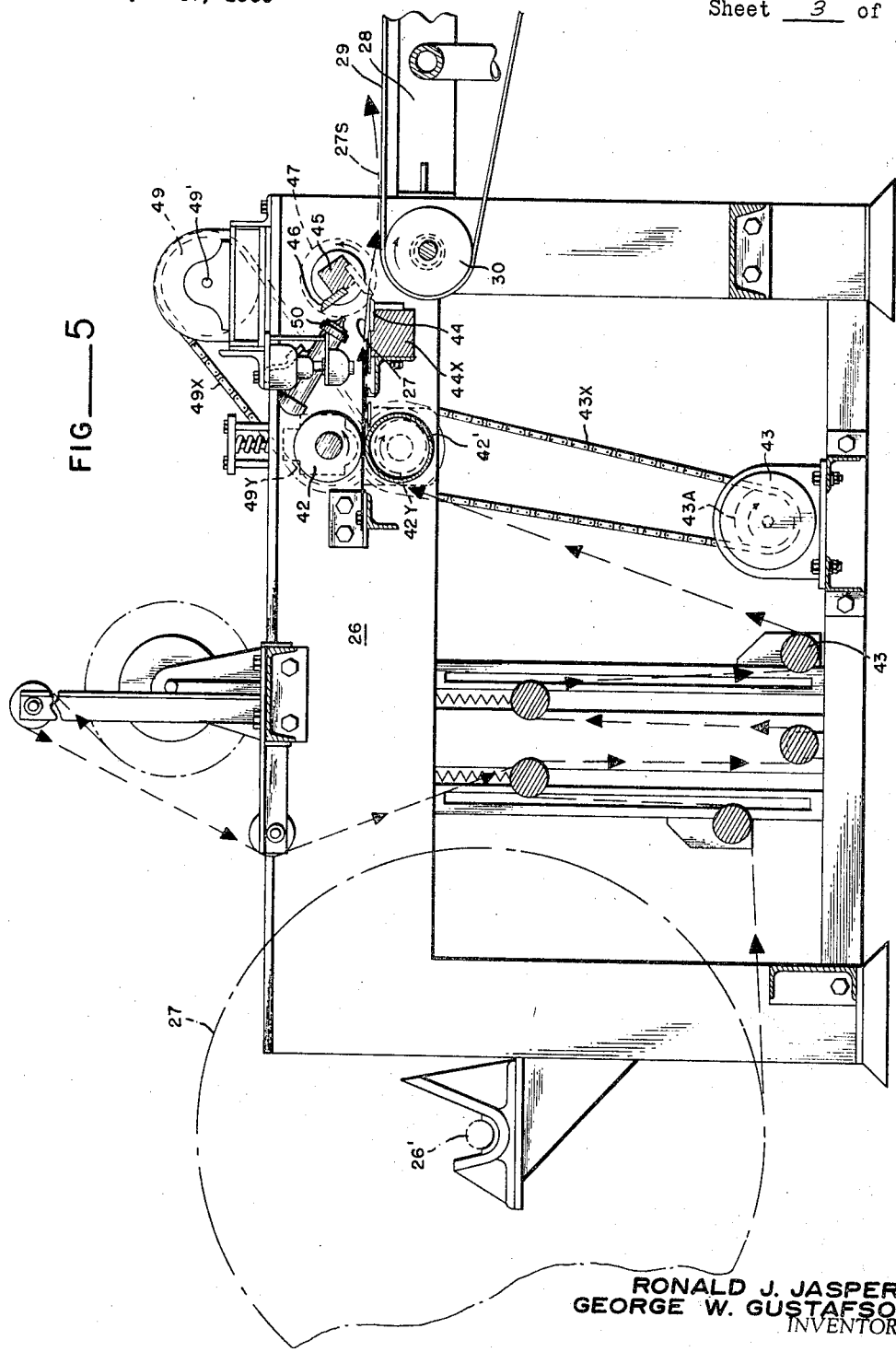
FIG__5
RONALD J. JASPER
GEORGE W. GUSTAFSON
INVENTORS
BY Seed & Berry
ATTORNEYS

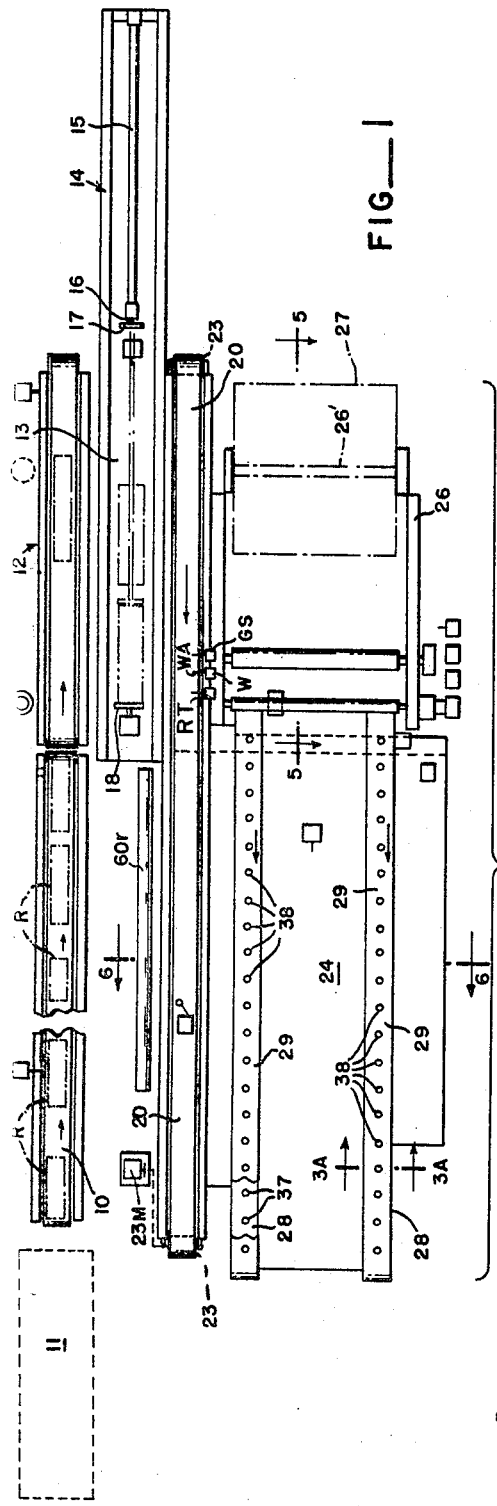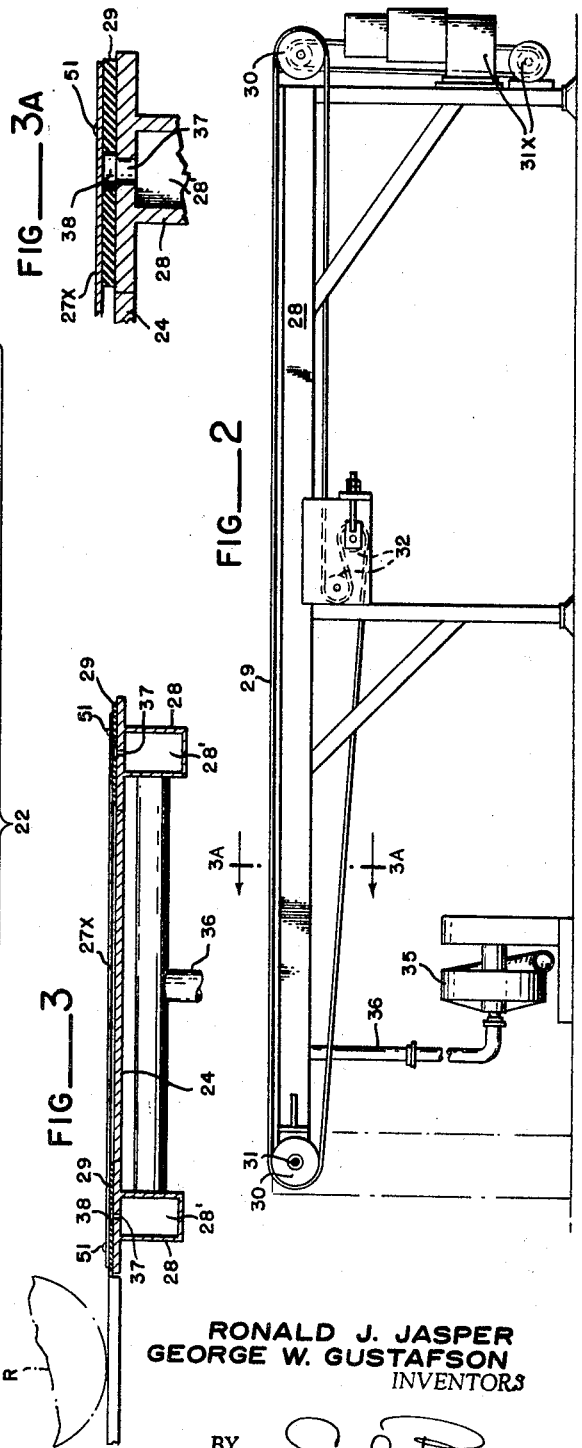
RONALD J. JASPER
GEORGE W. GUSTAFSON
INVENTORS
BY Seed & Berry
ATTORNEYS

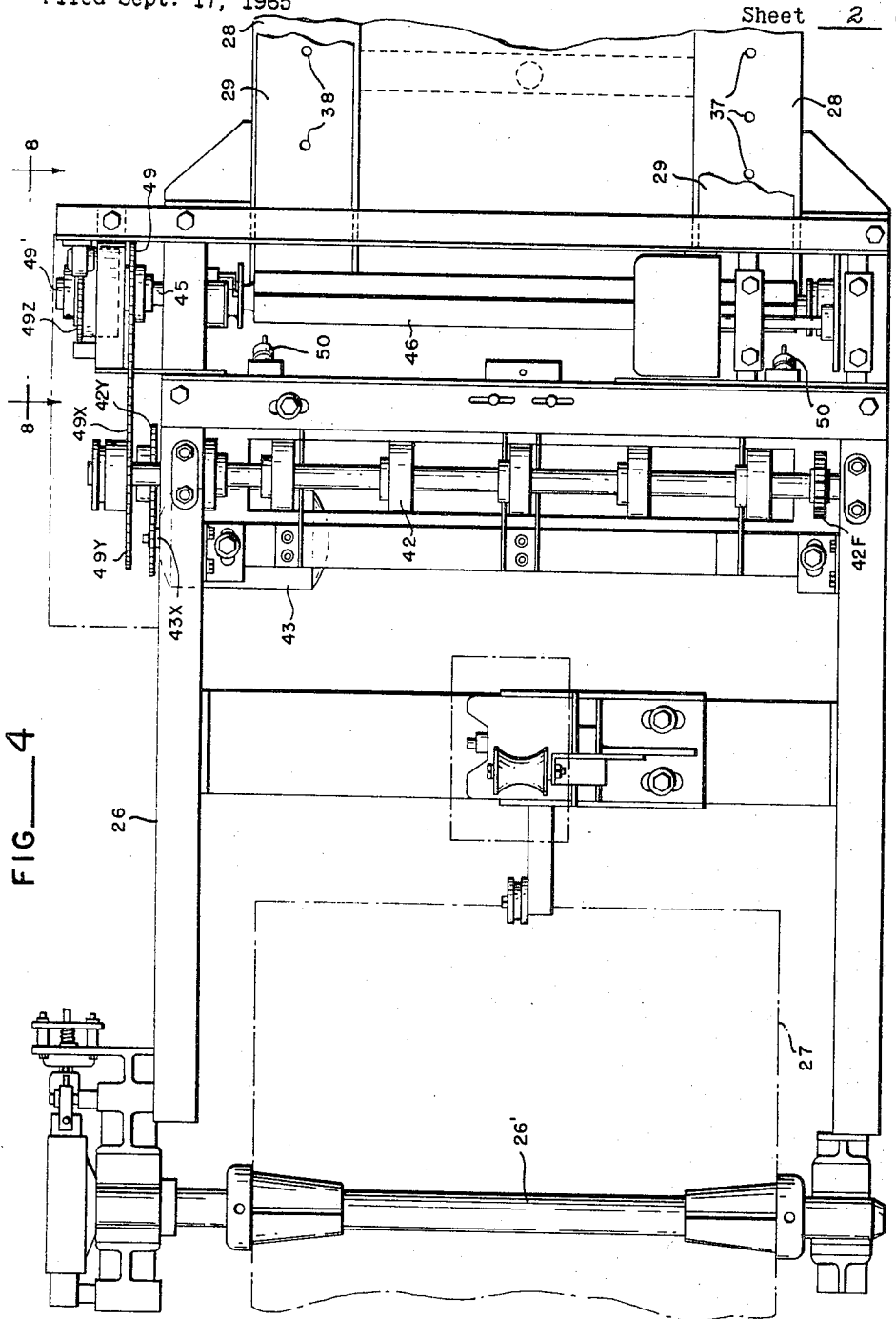

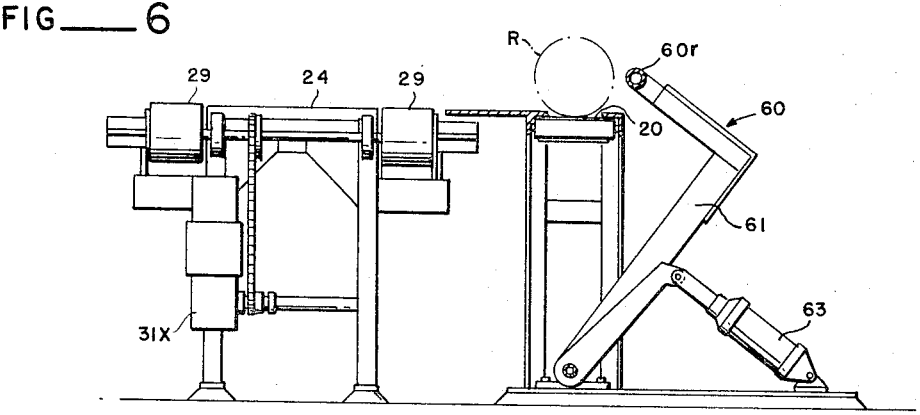
FIG__6
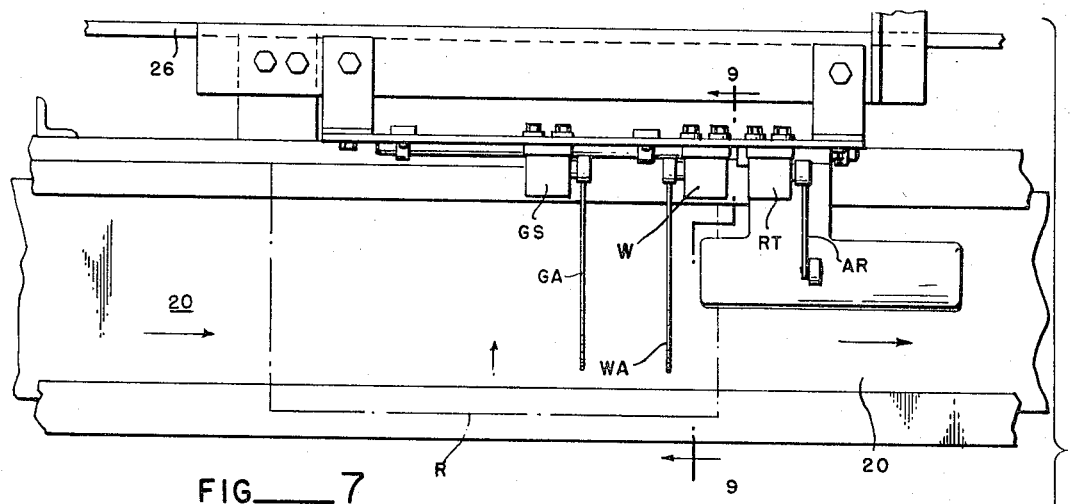
FIG__7
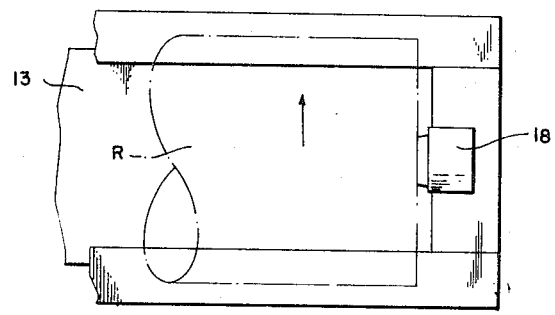

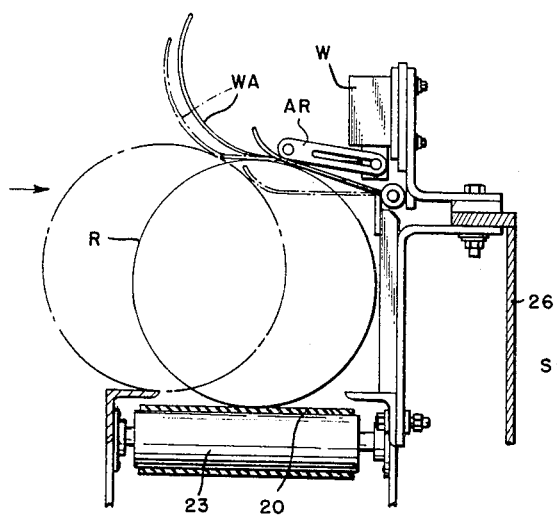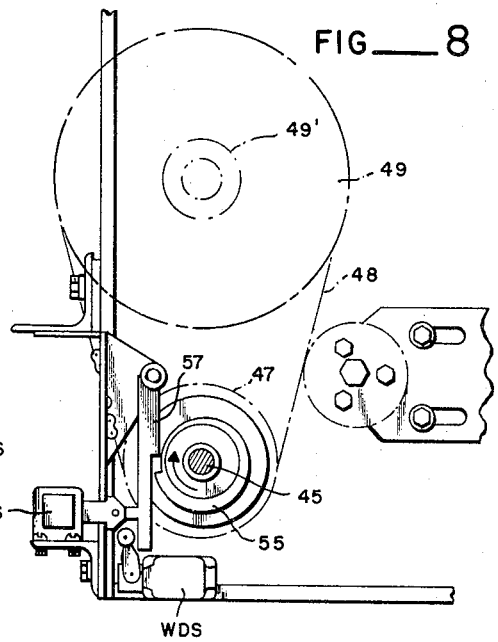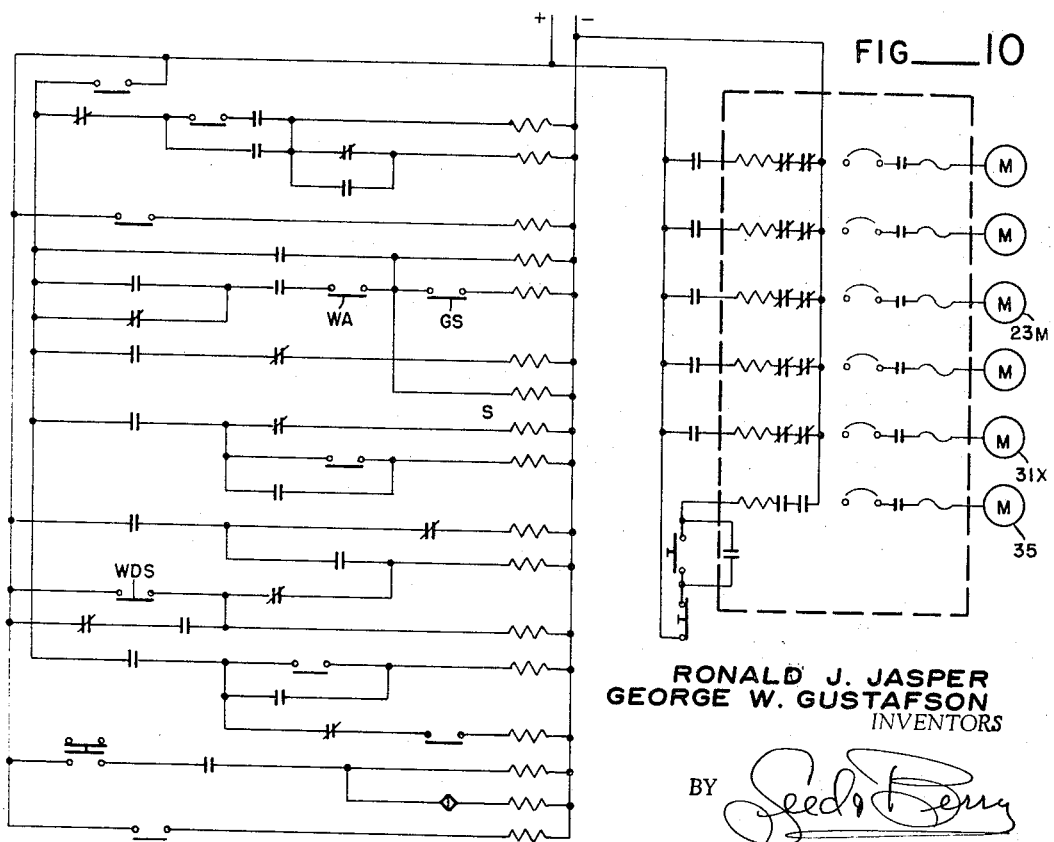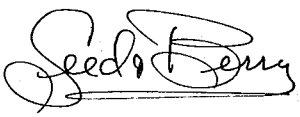

United States Patent Office 3,429,097
Patented Feb. 25, 1969

3,429,097
WRAPPER DISPENSING AND ROLL WRAPPING MECHANISM
Ronald J. Jasper and George W. Gustafson, Hoquiam, Wash., assignors to Lamb-Grays Harbor Co., Inc., Hoquiam, Wash.
Filed Sept. 17, 1965, Ser. No. 488,082
U.S. Cl. 53—66                    12 Claims
Int. Cl. B65b 57/02, 57/12, 11/04

ABSTRACT OF THE DISCLOSURE

A counter-roll wrapping system wherein individual counter rolls are advanced endwise along a conveyor table and a counter roll wrapper strip is dispensed simultaneously and at the same rate with the counter roll. The strip is severed in lengths corresponding to the lengths of the counter rolls and dispensed onto the conveyor table so as to follow the movement of the counter roll to a stop position. As the wrapper strip is dispensed, adhesive is applied to the edges thereof and, at the stop position, the counter roll is ejected and rolled across the wrapper strip with the adhesive causing the wrapper to adhere to the roll.

Background of the invention

This invention relates to means for applying protective wrappers to counter rolls and the like; the term "counter rolls" being the designation for those rolls of wrapping paper generally found on the counters of dry goods, hardware and grocery stores, and various other mercantile establishments.

Counter rolls are usually provided for the trade in various lengths and of standardized diameter of approximately nine inches and are individually protectively wrapped for their distribution to the trade.

It is the principal object of this invention to provide an improved, economically practical and expeditious roll wrapping procedure embodying a sequence of mechanical operations that are carried through without interruption, to convey said rolls in succession endwise along a wrapping table, to dispense a length of wrapping paper from a source of supply for each roll onto the table coincident with roll advancement causing the wrappers, as individually measured for the successive rolls, to be cut from the supply strip and each to be successively wrapped and adhesively secured about the specific counter roll for which it was measured.

More specifically stated, the present roll wrapping operation comprises the disposition of the counter rolls that are to be wrapped, successively and lengthwise on a conveyor belt for their conveyance thereby along one longitudinal side edge of the top of the wrapping table onto which the strip of roll wrapping paper is caused to be flatly advanced from its source of supply at the same rate of travel of the roll conveyor belt; each counter roll, incident to its advancement on the conveyor, effecting the operation of specific devices for measuring and cutting a length of wrapper, free from the supply for its advancement upon and along the table top, and at the same rate of roll conveyance, and then causing each advancing counter roll, upon reaching a specific point of advancement, to be displaced laterally from the conveyor belt and rolled across the wrapper strip, individually measured therefor, and the strip thereby caused to be wrapped about and adhesively secured to the roll.

It is another object of this invention to provide a novel sequence of counter roll wrapping operations, including those as above stated, whereby a succession of counter rolls of random lengths may be successively received on the roll conveyor, a measured length of wrapper cut and caused to be wrapped about each roll and the wrapped rolls discharged from the wrapping table in readiness for wrapper end crimping and roll end heading.

The present invention further resides in the provision, as a part of the counter roll finishing system, of roll wrapping mechanisms including the conveyor on which the counter rolls to be wrapped may be received in random lengths and conveyed thereon endwise either at regular or irregular intervals of spacing, along and at the level of the top surface of the wrapping table onto which the measured and cut lengths of roll wrapping paper are caused to be advanced in accordance with the rate of conveyance of the counter rolls therealong. Also, to include devices whereby each counter roll, in its delivery onto and its advancement by the conveyor belt, actuates and energizes controls that operate the particular mechanisms for the dispensing of the strip of roll wrapping paper onto the wrapping table; for applying an adhesive substance to the opposite edge portions of the wrapper strip as dispensed; for cutting the measured length of wrapper for each roll free from the supply strip and finally causing each counter roll upon reaching a certain point in its conveyance to be laterally displaced from the conveyor belt, and rolled across the table top and the wrapper individually measured therefor and the wrapper to be picked up and rolled thereonto and adhesively secured in place, and finally each roll, as thus wrapped, to be discharged from the wrapping table for wrapper end crimping and roll end heading.

It is also an object of this invention to provide means whereby each counter roll, as initially received on the belt for its conveyance, will be caused to energize adhesive dispensing guns in proper timing with wrapper strip advancement, and to shut them off in proper timing, in reference to the dispensed length of wrapper, that those leading and trailing edge portions of the measured wrappers, as provided for crimping against the roll ends, will not receive any adhesive thereon.

Still further objects and advantages of the present invention reside in the arrangement of the various devices used in conjunction with the wrapper strip dispensing means, for establishing the length of wrapper for the particular roll that is to receive it.

In accomplishing the above mentioned and other objects of the invention, we have provided the improved details of construction and combination of parts, the preferred forms of which are illustrated in the accompanying drawings, wherein:

FIG. 1 is a plan or layout of a counter roll finishing system including therein the present counter roll wrapping mechanisms of this invention.

FIG. 2 is an enlarged, side view of the counter roll wrapping table of this mechanism shown apart from the supply roll of wrapping material and the means for dispensing the strip of wrapping material therefrom onto and along the wrapping table top.

FIG. 3 is an enlarged cross-section of the wrapping table, taken in the vertical plane of line 3—3 in FIG. 2.

FIG. 3A is an enlarged cross-sectional detail taken on line 3A—3A in FIG. 2.

FIG. 4 is an enlarged plan view of the body wrapper strip dispensing means, including the glue dispensing guns and wrapper cut-off means.

FIG. 5 is an enlarged vertical section, taken on line 5—5 in FIG. 1, showing the wrapper strip feed and the cut-off means.

FIG. 6 is an enlarged cross-sectional view taken on line 6—6 in FIG. 1, showing the roll kicker means.

FIG. 7 is an enlarged fragmental plan view showing the several control switches as applied to the roll receiving side of the wrapper dispensing frame of the machine, and an adjacent portion of the plug seating press.

FIG. 8 is an enlarged detail of the fly knife drive and stop clutch device as seen when looking through the vertical plane of line 8—8 in FIG. 4.

FIG. 9 is an enlarged sectional detail taken on line 9—9 in FIG. 7, showing the roll actuated switch for energizing the wrapper dispenser and that for deactivating the adhesive dispensing gun.

FIG. 10 is a schematic lay-out of the electrical system of the present apparatus.

Before going into the detailed explanation of the accompanying drawings, a brief description of the sequence of operation of this invention will be given as an aid for the proper understanding of what is to follow. It is to be explained further that the present counter roll wrapping mechanisms form a portion of a "Counter Roll Finishing System" which is to be disclosed and claimed in a separate application to be filed later.

In accordance with the present invention, counter rolls which are received in random lengths are rolled laterally from a plug seating press onto a conveyor belt and are conveyed endwise thereon parallel with and along one longitudinal side edge of the top of a wrapping table. As each roll is received on the conveyor belt, it engages and thus actuates a switch arm that closes a switch to energize means for dispensing a strip of wrapping paper from a supply roll onto and for advancement along the top of the wrapping table. This switch also energizes glue dispensing guns that operate to dispense ribbons or strips of adhesive onto and along the opposite edge portions of the dispensed wrapper strip. Then a measured length of dispensed wrapper is severed from the supply strip. The conveyed rolls, in succession engage with and actuate a kicker device that operates to propel each roll from the conveyor belt, across the advancing corresponding measured wrapper. In this rolling operation, each counter roll picks up the near glued edge of its wrapper and causes it to be wrapped thereabout and adhesively secured thereto.

Referring more in detail to the drawings:

In FIG. 1, 10 designates a conveyor belt upon which counter rolls R of random lengths and irregularly spaced are shown as being conveyed from a point of counter roll production, designated at 11, to an operator's station 12 for manual core plug application, and from which station the rolls R are then successively laterally rolled or pushed at proper time intervals onto the bed 13 of a powered plug seating press that is herein designated in its entirety by numeral 14. The plug press 14 comprises a hydraulic or other pressure medium power cylinder 15 equipped with an extendable piston rod 16 having a disk like outer end head 17. An abutment 18 is fixed on the press bed 13 in spaced relationship from and in alignment with the power cylinder 15. A counter roll R advanced from station 12 is received between the rod end piston head 17 and the abutment 18. Energization of cylinder 15 then causes its piston rod 16 to be extended and its end head 17 the head end of the counter roll R as disposed on bed 13, thus to move the roll endwise until its opposite end plug seats firmly against the abutment 18 and then, by continuing piston pressure, to firmly press the applied plugs fully into the roll ends. The plugged counter roll R is then laterally displaced from the press bed 13 either by suitable automatic means not herein shown, or manually moved onto a horizontally moving conveyor belt 20 that receives the roll R directly from the press 14 endwise thereon; this conveyor belt 20 being extended parallel with and closely along the frame structure of a unitary wrapper dispensing mechanism and roll wrapping table that is shown in FIG. 1 to be spanned by the bracket 22. The delivery of a counter roll onto the conveyor belt 20 is the start of the present roll wrapping operation.

The conveyor belt 20 is continuous and it extends horizontally substantially to the full length of the bracketed unit, passing at its opposite ends about supporting belt wheels 23—23. At least one of these supporting wheels is driven by a motor and belt connection, indicated at 23M in FIG. 1. Plugged counter rolls to be wrapped are delivered from the press bed 13 onto the conveyor belt 20 as stated above at regularly or irregularly spaced intervals suitable for this operation, for their endwise conveyance thereon, first along the near side of the wrapper dispensing unit as in FIG. 1 and then along the side edge of the top surface of an elongated wrapping table herein designated by numeral 24, onto which table top each roll R is ultimately laterally displaced from the conveyor belt 20 and caused to roll directly across the table top and a measured length of wrapper for the application and securement of the wrapper thereto, as will presently be more fully described.

That assemblage of devices or mechanisms shown in FIG. 1, and spanned by the bracket 22 and embodying the roll conveyor, the wrapper strip dispensing devices and the individual wrapper measuring and cut-off means is best shown in FIGS. 1, 4 and 5. They will be now described more in detail.

Located at the right hand end of the wrapping table 24, as shown in FIG. 1, is a rigidly constructed frame 26 mounting a horizontal cross-axle 26' therein; this axle being best shown at the left hand end in both FIGS. 4 and 5. On this axle 26' a large supply roll 27 of counter roll wrapping paper is rotatably mounted.

It is also shown in FIGS. 1, 2 and 3 that at each of the opposite side edges of the top of the wrapping table 24 and coextensive therewith are relatively narrow and hollow vacuum tables 28—28. These tables have top walls disposed at the same level as the top of table 24 and closely adjacent thereto and are chambered as best shown at 28' in FIG. 3 to their full lengths.

Extended along each of the chambered vacuum tables 28—28 and to their full lengths are continuous wrapper strip pick-up belts 29—29; each belt being mounted for the sliding travel of its top run on the top wall of the corresponding table 28 and for travel at its opposite ends about belt carrying and driving wheels 30—30. Those wheels 30 that carry the outer ends of these belts, as shown in FIGS. 1 and 2, are mounted by a cross-shaft 31 that is mounted in and extended horizontally across the discharge end of the table supporting frame as seen in FIG. 2. The wheels 30 at the right hand end of the belts 29, as shown in FIG. 2, are driven by a motor and belt connection designated at 31x in that figure.

Each belt 29 has its bottom run extending along and below the bottom wall of the corresponding table 28 and medially of its ends, passes about adjustably mounted belt tightening rollers 32, as shown in FIG. 2. The travel of these belts 29—29 is in unison and in the direction indicated by the arrows placed thereon in FIG. 1. Also, they travel in the same direction and at the same rate of travel of the conveyor 20 on which the counter rolls R are advanced after being received from the press 14.

A desired degree of vacuum is maintained in each of the hollow tables 28—28 by means of a motor driven vacuum pump, designated at 35 in FIG. 2, having a suction pipe connection 36 with both chambered tables 28, as best shown in FIGS. 2 and 3.

The top wall of each table 28 is horizontal and flush with the top of table 24 and is formed to its full length with a row of small closely spaced apertures 37. Each belt 29, likewise, is formed with a continuous row of spaced apertures 38 of somewhat larger diameter than the apertures 37 of the tables 28 and are positioned for travel in coincidence with the row of apertures 37 in the top wall of the corresponding belt supporting table, as shown in FIGS. 3 and 3A.

With the lateral displacing of each counter roll R from the plug press abutment 18 directly onto the conveyor 20 it moves, as shown in FIG. 9, beneath and lifts the end of a controlling lever arm WA of a limit switch W that is mounted on the near side of the frame structure 26 of the wrapper dispenser. As this switch arm is lifted the switch W is thereby closed, thus to energize relays and motor starters that act to start the motor 23M for travel of the conveyor belt 20 in the direction indicated by the arrow thereon in FIGS. 1 and 7.

Note that the switch arm WA first engages the top edge of the entering roll R immediately adjacent its forward end and slides along the top of the roll as it is advanced by the conveyor thus keeping the switch W closed. However, with the passing of the roll from beneath the arm, the arm drops free and thereby opens the switch W.

That lifting of the switch arm WA that starts the conveyor 20 also starts the dispensing of the wrapper strip from the wrapper supply roll 27 by drawing its outer end portion between a pair of feed rollers 42—42; and this dispensing continues until after the switch arm WA drops from the trailing end of roll R.

The closing of switch W, as above stated, also energizes the motor 31x to start the travel of the paired wrapper pick-up belts 29—29 along the tops of tables 28—28 and onto which the dispensed end of strip 27 as advanced thereto is held by suction applied through the belt apertures for its advancement; this dispensing of the wrapper 27 being at the same rate of travel as the conveyor 20. Thus, the belt conveyed roll R and its measured wrapper strip will advance along the table side by side to the same extent.

The operation of the wrapper feed rolls 42–42' dispenses the end of wrapper strip 27x from the supply roll across the fixed blade 44 that is mounted by a cross-bar 44x and thence onto the table top 24 and pick up belts 29—29. Associated with the fixed blade 44 is a rotatably mounted mandrel 45 mounting fly blade 46. The dispensed wrapper strip end 27x normally is advanced freely between these blades 44 and 46, as shown in FIG. 5, with the fly blade at rest at 12 o'clock position.

Mounted in the frame structure 26 near opposite sides thereof above the dispensed wrapper strip and just within the ends of blade 46, as shown in FIGS. 4 and 5, are the paired glue guns 50—50, so located as to discharge ribbons or spray lines 51—51 of adhesive onto the top surfaces of opposite edge portions of the dispensed wrapper, as seen in FIG. 3. A glue spray control valve GS, shown in FIG. 7, is energized by the switch W as it starts the dispenser. This valve is located at the roll entering side of the frame 26 is shown in FIG. 7 and is opened by a lever arm gs that is lifted by and rides on the advancing counter roll, as in FIG. 7. This switch GS is used as a glue cut-off in order to insure that the guns 50—50 will stop their discharge of glue onto the wrapper being dispensed before the trailing end of roll R clears the switch arm WA, and will thus avoid the application of adhesive to the trailing end portion of the dispensed wrapper that is to be embodied in that end crimp.

At one end of the fly blade mounting shaft or mandrel 45, as seen in FIG. 8, is a sprocket wheel 47 over which a chain belt 48 driven by belt wheel 49 operates to rotatably drive the mandrel. Also, a shouldered driving clutch cam 55 of disk-like form is fixed on the mandrel 45 in position to be engaged by a shouldered stop bar 57, see FIG. 8, that is pivoted on the frame 26 in position to engage with and normally hold the mandrel against rotation, thus to stop and hold the fly knife at its 12 o'clock or open position. When the dispensed wrapper strip 27 has advanced to the proper measured length across the blade 44, is determined by the length of the roll R that is to receive it, and the strip draw rolls 42–42' have stopped, the stop bar 57 is pulled free of the cam shoulder by a controlling solenoid S and the mandrel 45 is then driven through one complete turn to cause the fly blade 46 to coact with the blade 44 to sever the strip. The bar 57 is then released and the fly blade is stopped after one revolution at its 12 o'clock position.

It has been shown in FIG. 5 that the lower draw rolls 42 are driven by an electric motor 43 through a chain belt connection 43x. The two draw rolls 42—42 are driven in unison in opposite directions by a geared connection shown in FIG. 4 at 42f. Also, a sprocket chain belt 49x extends about a sprocket wheel 49y on one end of the mounting shaft of draw roll 42, see top of FIG. 4, and a sprocket wheel 49 on the mounting stub shaft 49' of the clutch cam driving connection shown in FIG. 8. Also, a sprocket chain belt operates about a sprocket wheel 49Z, shown only in FIG. 4, as being mounted on the hub of sprocket 49Z to drive the shouldered cam 55.

When the solenoid S is energized by the switch W to pull the stop bar 57 free of the stop shoulder of the cam 55, the mandrel 45 is released for rotation by sprocket 49x to turn through on complete rotation. As the fly blade 46 turns through its initial arc, the wrapper strip being dispensed onto table 24 is paid out an additional length of 3½ inches before its trailing end is cut free by the fly blade. Then during the travle of the fly blade back to its normal 12 o'clock position, the oncoming wrapper strip is advanced approximately 3½ inches. Thus incident to rotation of the fly blade mandrel the additional crimping lengths are added to the advancing and oncoming wrappers.

Further in explanation to this operation, it will be stated that although it has been previously indicated that the wrapper draw rolls 42–42' start and stop under control of switch W, actually as the trailing end of an advancing entering roll R on the wrapper feed section clears the switch arm WA, the switch signal starts the cut cycle and the wrapper feed section; the wrapper dispenser and the wrapper pick up belts 29—29 and these are maintained running and the fly cutter clutch is tripped by solenoid S, to make one revolution for severing the measured strip, and then a cam will actuate the wrapper dispenser and stop switch WDS to stop the dispenser.

Switch WDS is shown in FIGS. 1 and 8. In this latter view, the switch is shown to be actuated by the return of the stop bar 57 to its stop position and is opened when clutch cam 55 is released for rotation.

The length of wrapper cut from the supply roll is determined in part by the switch W, but when a measured length of wrapper is cut free from the supply roll 27, its trailing end is still within the confines of the frame 26. Therefore, in order that the travel of the belts 29—29 may continue and thus clear the measured wrapper from the dispenser, their operation is maintained by means of a switch RT shown in FIG. 7, to be so disposed that when the trailing end of the advancing roll R has cleared the switch arm WA and the feed rolls 42—42' have stopped, the pick-up belts 29—29 will still continue to advance the feed strip 27S fully onto the table 24. Also, the conveyor belt 20 will continue to travel to keep the roll R in proper relationship to the dispensed wrapper.

As the roll clears the lift arm AR of the actuator switch RT, the belt 20 and belts 29—29 stop. The advancing roll R is then laterally displaced from belt 20 by a kicker mechanism 60 shown in FIG. 6 and is caused to roll directly across the table top 24 and the measured wrapper 27S for its wrapping in the measured wrapper strip.

The kicker device 60 is shown to comprise a roller 60r that is mounted horizontally at the side of the wrapping table 24; being supported at the top end of a supporting and actuator arm 61 that is pivotally mounted at its lower end on a fixed support and has an actuator cylinder 63 operatively connected thereto. Upon energization of this cylinder by the advancing roll R, it operates to roll the roll R across the table top 24 and the wrapper strip that has been measured therefor.

With the rolling of roll R across the measured strip, as held by the pick-up belts 29—29, the glue strip 51 at the near edge of the wrapper adheres to the roll R and carries the wrapper with it about the roll R. The glue strip 51 at the far edge of the wrapper than causes that edge of the wrapper to be secured to the wrapped roll. The wrapped roll is then discharged from the table top for its advancement to crimping devices from which it ultimately is delivered to the end heading devices; the latter devices for crimping and heading not being any part of the wrapping operation.

With the various mechanisms of this invention so assembled, the present operation of individually wrapping counter rolls as successively advanced from a plug press onto the roll conveyor belt 20 is carried out as follows:

As each roll is moved onto the belt 20 at the near side of dispenser frame 26, to which the several control switches are applied as shown in FIGS. 1 and 7, it actuates the switch arm WA of switch W to effect the energization of starter devices which start belt 20; the dispenser feed rolls 42–42′ and the wrapper pick-up belts 29—29 in motion. Thus, the wrapper dispenser operates to advance the wrapper strip 27 between the blades 44 and 46 and onto the pick-up belts 20—20 and along the table top. The glue dispensing guns 50—50 are also energized to dispense glue ribbons onto the wrapper strip edges as previously explained.

The counter roll is moved along the table top in synchronism with the advancement of the wrapper strip. When the switch arm of switch GS drops from the trailing end of the advancing roll R, the glue dispensing valve is shut off and then when the switch arm WA drops from the roll end the wrapper dispenser, energizing the solenoid S, causes a rotation of the cutter mandrel 45 and fly knife 46. This mandrel rotation adds 3½ inches to the trailing end of the measured wrapper and then after the cut has been made, it draws out another 3½ inches from the wrapper strip next to be advanced, these added lengths provide the projecting end lengths of successive wrappers for end crimping.

The continued driving of belt 20 after the cut-off of the measured length of dispensed wrapper results in the roll R actuating the kicker control switch for the ejection of the roll R across the table top and wrapper and the rolling of the latter about roll R for its securement.

It is to be explained further that the characterizing feature of the operation resides in the provision of a means for the wrapping of random length rolls R. The measured length of wrapper for each roll is controlled by the switch W in conjunction with the additional lengths which are incident to the fly knife rotation in making each wrapper cut-off operation.

Other ponits of consideration reside in the timing of the operation of the adhesive dispensing guns and the roll kicker 60.

What we claim is:

1. In a counter roll wrapping system, in combination; a table, a conveyor operable along a side edge of the table for the endwise conveyance of counter rolls thereon in spaced succession from a receiving point to a roll stop position, a roll wrapper dispenser at one end of said wrapping table operable for the successive dispensing of a wrapper strip therefrom onto said table at the rate of travel of said conveyor for subsequent application to the individually and successively advanced counter rolls, means for cutting individual wrappers from the strip for the advancing counter rolls, means for the advancement of said wrappers flatly along said table in accordance with the rate of conveyor advancement of the counter rolls therealong, means for applying an adhesive substance along the edges of the dispensed wrappers, and a device energized by each counter roll upon its conveyance to said stop position, to cause the counter roll to be rolled laterally from the conveyor, across the corresponding wrapper as disposed on the table top and the wrapper caused to be wrapped progressively thereabout in the rolling of the counter roll thereacross.

2. In a counter roll wrapping system comprising in combination; a wrapping table, a conveyor's belt operable along one edge of said table for the successive conveyance endwise thereon of counter rolls from a receiving point to a roll stop position, a wrapper dispenser mechanism at one end of the table for advancing a wrapper strip at the rate of conveyor advancement of said counter rolls, means for applying an adhesive substance along the edges of the strip, a wrapper strip cut-off mechanism actuated by each counter roll in its advancement, to cut off an individual wrapper for each roll and means for rolling each counter roll, upon its reaching the stop position, from the conveyor and across the table and the corresponding wrapper and for causing the wrapper to be rolled about the counter roll and for its securement thereabout.

3. In a counter roll wrapping system, in combination; a wrapping table, a conveyor belt operable along a side edge of said table for the endwise conveyance thereon of counter rolls of random lengths and in spaced succession thereon from a reception point to a roll stop position, a wrapper strip dispenser mechanism at the receiving end of said table operable for the dispensing of a wrapper strip therefrom onto the table top and for advancing it therealong at the rate of travel of the conveyor belt, means for applying an adhesive substance along the edges of the strip, a wrapper strip cut-off means energized by each counter roll as advanced by said conveyor belt for cutting from said wrapper strip, individual wrappers of measured lengths for the wrapping of the corresponding counter rolls as successively advanced by the conveyor and means for successively rolling each counter roll from the conveyor onto and across the corresponding wrapper upon its reaching the stop position, for the application of its wrappers thereto.

4. A counter roll wrapping system comprising, in combination, a wrapping table, a conveyor operable along one side edge of the table top for the endwise conveyance of counter rolls in succession thereon from a receiving point to a stop position, a wrapper dispenser disposed at one end of said table top, operable for the dispensing of a roll wrapper strip therefrom, flatly onto and along said table top, at the rate of travel of the conveyor, means for cutting individual wrappers from said strip for the advancing counter rolls, means associated with the wrapper dispenser for applying an adhesive substance onto and along top surfaces of the opposite side edge portions of the individual wrappers, as advanced from the dispenser, means energized by each conveyed counter roll upon its arrival at the roll stop position, to displace said roll laterally from the conveyor and cause it to roll across the corresponding wrapper and the wrapper to be progressively rolled thereabout and secured at its edges thereto by the applied adhesive.

5. A counter roll wrapping system comprising in combination, a wrapping table with a flat top, a conveyor operable along one longitudinal edge of the table top for the endwise and successive conveyance thereon of counter rolls of random lengths and in random spacing, from an established receiving point to a roll stop position, a wrapper dispenser at one end of said wrapping table operable for the dispensing of a wrapper strip onto the table top, means for advancing said strip flatly onto and for moving it along the table top in accordance with and in the direction of travel of the conveyed roll, means for successively severing individual roll wrappers from said dispensed wrapper strip for the advancing counter rolls, means operable along the table for causing each individual wrapper to be moved along the table top evenly and in timing with the travel of the counter roll that is to receive it, adhesive dispensing guns energized by each roll incident to its delivery onto the conveyor to energize the guns to discharge adhesive onto and along opposite edge surface portions of the wrappers as delivered, a switch operable by each conveyed roll upon its reaching the roll stop position to stop the conveyor and to actuate a kicker means for effecting the rolling of that roll from the conveyor across the table and its companion wrapper for the adhesive attaching and progressive wrapping of its wrapper thereabout.

6. A combination according to claim 5 wherein wrapper pick-up belts operate upon and along opposite edges of the table top parallel with and at the same rate of travel of said roll conveyor and wherein said wrapper strip is dispensed onto said table top with its opposite edge portions flatly overlying said pick-up belts for their conveyance of the measured wrappers flatly thereby along the table top to receive the rolls thereacross.

7. A combination according to claim 6 wherein vacuum tables extend along opposite side edges of the table top, and said pick-up belts operate along and upon the tops of said vacuum tables; said vacuum tables and belts having perforations therethrough and said wrapper pick-up belts operate along the perforated tops of said vacuum tables for the application of vacuum from the vacuum table perforations, through the belt perforations to the wrappers to draw them flatly against the belts and move them along the table top for the roll wrapping operation.

8. A counter roll wrapping system comprising in combination, a wrapping table, a conveyor operable along one side edge of said wrapping table for the successive endwise conveyance of counter rolls of random lengths thereon from an established receiving point to a stopping point, a wrapper strip dispenser at one end of said table embodying coacting wrapper strip feed rollers between which a dispensed wrapper strip may be drawn and advanced from a source of supply onto and along the table top in unison with travel of said conveyor, adhesive dispensing guns associated with said dispenser and operable for the dispensing of adhesive therefrom onto and along opposite longitudinal edge portions of said wrapper strip as it is dispensed by said feed rolls, a controlling means actuated by the delivery of each counter roll onto the conveyor to energize the conveyor and the wrapper strip dispenser for its dispensing of the wrapper strip, a cutter operable to cut individual wrappers from the dispensed strip for their advancement along the table top in accordance with the travel of the corresponding counter roll, means for energizing said glue guns, switch means actuated by the conveyed roll to de-energize the glue guns momentarily before the strip reaches the point for its cut-off from the supply, means operable from the strip dispenser means for actuating the cutter to sever the measured length of wrapper strip dispensed thereby and means energized by the counter roll when it reaches the stop point to cause it to be rolled onto said table and across the severed strip for the adhesive adherence of the near edge of the wrapper thereto and causing it to be wrapped, in its rolling travel across the table, and the subsequent adhesive securement of the other glued end of the wrapper to the roll.

9. A roll wrapping system according to claim 8 wherein each counter roll as received onto the conveyor at the starting point actuates a switch that energizes the wrapper dispenser to dispense a wrapper strip onto and along the table top at the same rate as the roll advancement by said conveyor, and for energizing a rotary wrapper cut-off knife to sever an individual wrapper for that roll of a measured length corresponding to the length of the roll and an additional amount sufficient for the crimping of its opposite end portions against the roll end surfaces.

10. A combination according to claim 8 wherein the wrapper strip dispenser comprises coacting feed rolls between and by which the strip is fed from the strip supply and wherein the dispenser starting switch embodies a controlling arm that is caused to be lifted by each counter roll as received on the roll conveyor to start the conveyor and to slide on and along the roll as it advances and to drop from the roll end to initiate cutting of the wrapper to measured length and in sequence to stop the dispenser after a measured length of wrapper has been dispensed.

11. A combination according to claim 10 wherein the dispenser starting switch also energizes the adhesive dispensing guns, and wherein a cut-off switch with starting arm is so disposed as to be lifted by the entering roll to energize the adhesive dispensing guns with the starting of the dispenser and to drop from the roll to shut off the dispensing guns prior to the cutting off of the dispenser by the first mentioned starting arm.

12. A combination according to claim 8 wherein before each measured length of wrapper has been cut free of the supply strip, and after the adhesive dispensing guns have been cut off, the coacting feed rolls are driven from the wrapper cut-off mechanism to advance the measured wrapper an additional distance before being cut off thus to give it the required additional length for end crimping.

References Cited

UNITED STATES PATENTS

| 2,738,062 | 3/1956 | Edgecombe | 53—214 X |
| 2,831,304 | 4/1958 | Michaud | 53—211 |
| 2,860,462 | 11/1958 | Sykes | 53—66 |
| 3,029,571 | 4/1962 | Douthit | 53—66 |
| 3,296,772 | 1/1967 | Barker | 53—216 X |

FOREIGN PATENTS 923,868  4/1963  Great Britain.

TRAVIS S. McGEHEE, *Primary Examiner.*

NEIL ABRAMS, *Assistant Examiner.*

U.S. Cl. X.R.

53—74, 214, 216